Jan. 14, 1936.  T. E. McFALL  2,027,606
TRAILER BRAKE CONSTRUCTION
Filed June 28, 1935
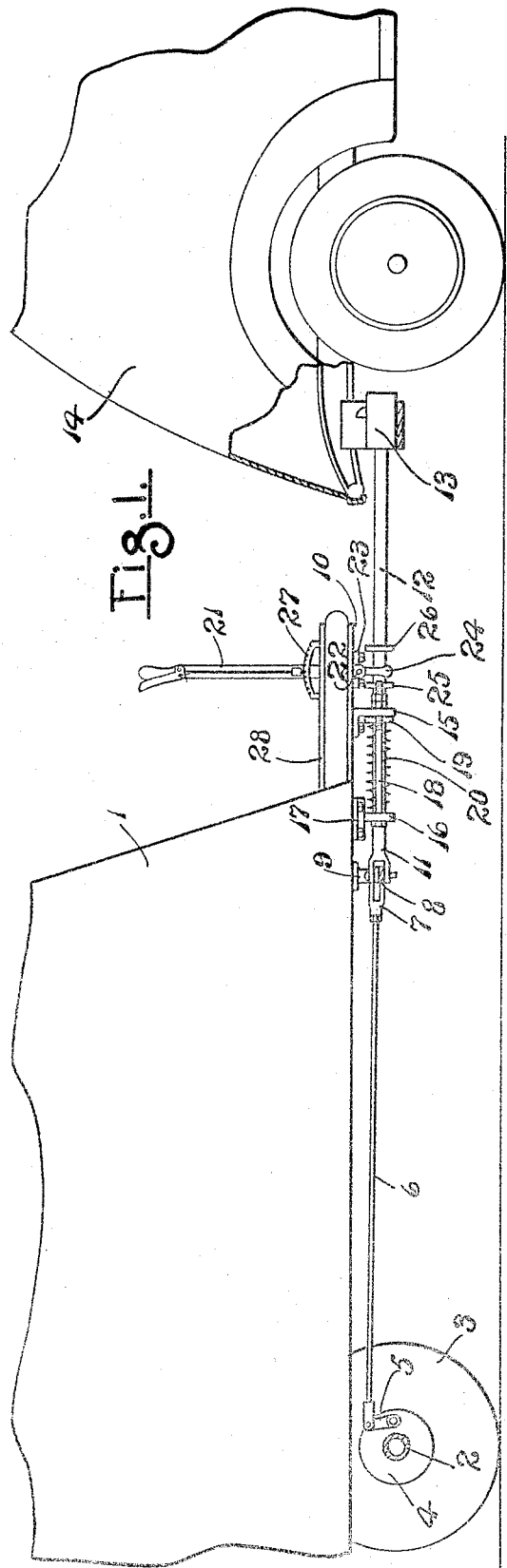
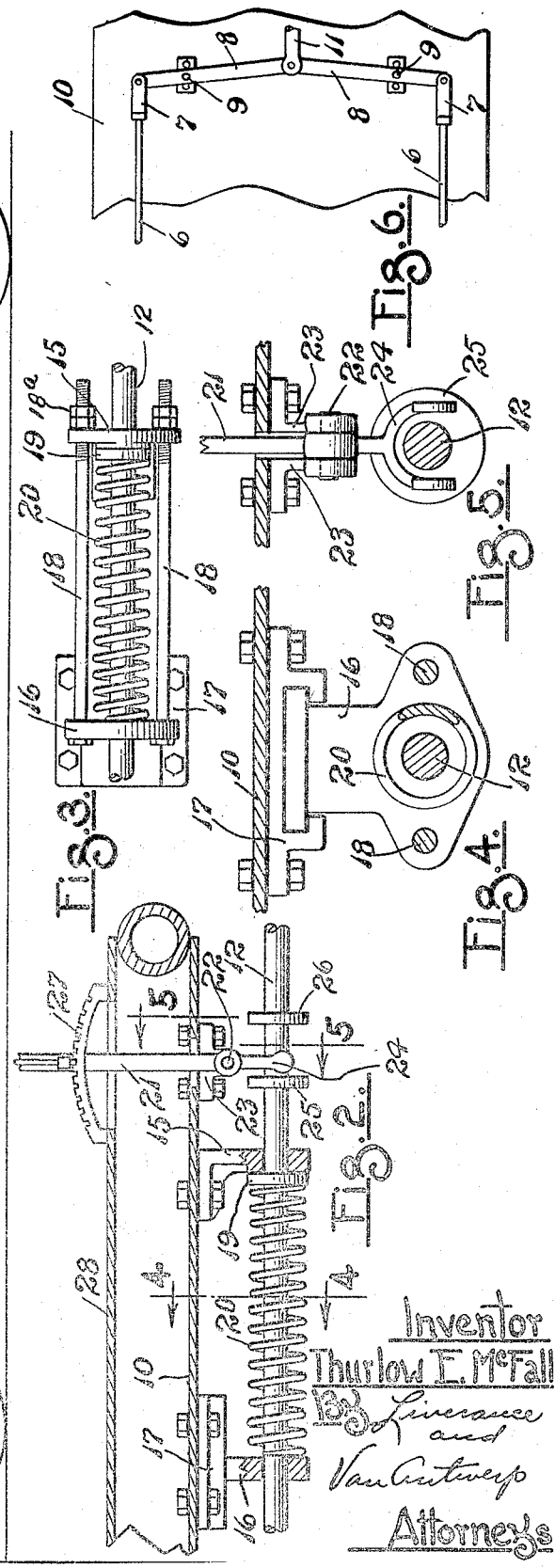

Patented Jan. 14, 1936

2,027,606

UNITED STATES PATENT OFFICE 2,027,606

TRAILER BRAKE CONSTRUCTION

Thurlow E. McFall, Sparta, Mich.

Application June 28, 1935, Serial No. 28,793

4 Claims. (Cl. 188—112)

This invention relates to a brake applicable to trailers, particularly of the house trailer type, though in no sense limited thereto.

In pulling a house trailer over the road behind an automobile there are times when there is a tendency for the trailer to move faster than the automobile, for example, when brakes are applied to the automobile to rapidly slow the same down, or on going down a steep grade and the like. In such case it is very desirable that the trailer be braked against tendency to rapid forward movement, and such braking should not fall entirely upon the braking equipment of the automobile. With my invention brakes which will work automatically upon the carrying wheels of the trailer are provided, together with means whereby said brakes will operate only after a predetermined forward pressure of the trailer against the automobile has been reached. At the same time, at all times when the automobile is pulling the trailer, the brakes are ineffective and there is a positive pulling connection between the automobile and the trailer.

It is further desirable that when the trailer is disconnected from the automobile that it be held against accidental or other undesired movement. My invention contemplates manually operable means for setting the brakes to hold the trailer against movement when it is disconnected from the automobile. Likewise, there may be many times when the brakes should not be operated, at least there are many times when travel over substantially level roads where there is no need for the brakes on the trailer to work and perform their office. My invention also includes means whereby the same manually operable means which is used to set the brake when the trailer is separated from the automobile may be utilized to render the brakes on the trailer inoperative or ineffective.

All of these features of novelty and of utility together with novel constructions for attaining the same may be understood from the following description of the invention, taken in connection with the accompanying drawing, in which, Fig. 1 is a side elevation illustrating the braking apparatus of my invention.

Fig. 2 is a fragmentary somewhat enlarged section showing the mounting and structure of the braking apparatus.

Fig. 3 is a fragmentary underplan view of the controlling spring and the manner in which it is mounted and utilized with the other elements of the construction.

Figs. 4 and 5 are fragmentary transverse vertical sections substantially on the planes of lines 4—4 and 5—5 of Fig. 2, looking in the direction indicated by the arrows, and Fig. 6 is a fragmentary underplan view illustrative of the connections leading to the two brakes on the trailer wheels.

Like reference characters refer to like parts in the different figures of the drawing.

The trailer comprises a suitable body 1 carried on a chassis which in turn is mounted upon a transverse axle 2, at the ends of which the wheels 3 for carrying the trailer are mounted. With each of the wheels a braking apparatus, including a brake drum 4, is associated, the brakes being set by a forward pulling movement upon an arm 5 associated with each brake drum. The specific construction of the brake mechanism need not be entered into as it forms no part of the present invention.

From the upper ends of the arms 5 connecting rods 6 lead forward, each at its front end being connected to a stirrup 7. The stirrups 7 are each connected to the outer end of a lever 8, which levers extend toward each other with ends overlapping, being pivotally mounted between their ends at 9 on suitable brackets extending below and mounted upon a lower covering plate 10 which is attached at the underside of the trailer chassis. The overlapping ends of the levers 8 are pivotally connected to a clevis 11 which is secured at the rear end of a longitudinal rod 12 which extends forward in front of the trailer and detachably connects with a suitable coupling 13 secured in any desired manner to the automobile 14 which is to draw the trailer.

The rod 12 passes slidably through a bracket 15 secured to the bottom plate 10 previously described. It also passes through a second bracket 16 located a distance back of the bracket 15 and adjustably mounted on a suitable guide fixture 17 permanently secured to the plate 10. Rods 18 pass through the brackets 15 and 16 the heads of the rods bearing against the rear side of the brackets 16. Nuts 18a are threaded onto the front ends of the rods at the front side of the bracket 15 whereby the bracket 16 may be adjusted, within the limits of the length of its supporting fixture 17, by adjustment of the nuts on the rod. A collar 19 is permanently secured to the rod 12 immediately back of the bracket 15 and a heavy coiled compression spring 20 is located around the rod 12 between the collar 19 and the front side of the bracket 16.

It is evident that when the automobile is moving forward and is pulling upon the rod 12 collar 19 abuts against the bracket 15 and the trailer is drawn after the automobile.

Should the brakes be applied to the pulling vehicle, such as the automobile 14, and there be a tendency for the trailer to push forward so that the rod 12 is subjected to a push by the trailer, if the force of said push is sufficient it compresses the spring 20, the rod 12 moves rearwardly relative to the trailer body, thereby turning the levers 8 about their pivots at 9 and exerting a forward pull upon the connecting rods 6 to thus apply the brakes to the trailer wheels. The adjustment provided by the rods 18 and the movable mounting of the bracket 16 permits the spring 20 to be initially compressed to as great a degree as desired, and thus permits a range of control as to the times when the brakes on the trailer wheels will begin to automatically operate.

A lever 21 is pivotally mounted at 22 between its ends between two spaced apart supporting brackets 23 connected to and extending downwardly from the bottom plate 10. The lever 21 at its lower end below the pivot 22 is forked at 24 and straddles the rod 12 which carries two additional spaced apart collars 25 and 26 between which the members of the fork extend. A notched arc member 27 is mounted upon the forward extension 28 of the floor of the trailer so that the lever 21 may be held in any desired position.

When the lever 21 is vertical, as shown in Figs. 1 and 2, the normal operation of the brakes for the trailer is not affected. By swinging the upper portion of the lever to the rear the forks 24 are brought either against or closely adjacent to the forward collar 26 in which case there cannot be the previously described relative rearward movement of the rod 12 with respect to the trailer body in those cases where the trailer tends to overrun the speed of the pulling automobile; and the brake operation will not take place as previously described, and as it does under conditions where the lever 21 in the position shown in Figs. 1 and 2. On the other hand by turning the upper portion of the lever 21 in a forward direction, the forks 24 engage the rear collar 25, compressing the spring 20, and setting the brakes which operate in the drums 4 connected with the trailer wheels 3. This is done, for example, when the trailer is disconnected from the automobile, as at camp, or at any other time when it is desirable or it is essential to hold the trailer against accidental or other undesired movement.

The construction is relatively simple and particularly practical and effective. Its application to a trailer is simply attained, there are no parts to readily get out of order and in every way the construction is of an essentially practical type. The invention is defined in the appended claims and is to be considered comprehensive of all forms of structure coming within the scope thereof.

I claim:

1. In combination, a trailer body, an axle extending underneath the same, wheels on the axle, brakes associated with said wheels, spaced apart front and rear brackets connected to and extending downwardly from the underside of said trailer body adjacent the forward end thereof, a rod slidably mounted upon said brackets, a collar on the rod engaging against the rear side of the front bracket, a coiled compression spring around the rod between said collar and the front side of the rear bracket, means connecting the rear end of the rod with said brakes whereby on rearward movement of the rod the brakes are operated to check rotation of the wheels or to hold the same against rotation, manually operable means for setting said brakes said manually operable means also being movable to prevent the brakes from operating.

2. In a construction of the class described, a trailer body, an axle transversely underneath the body, wheels on the axle, brakes associated with said wheels, spaced apart front and rear brackets connected to and depending from the body, a rod slidably mounted on and extending through said brackets, a collar on the rod adapted to engage against the rear side of the front bracket, a coiled compression spring around the rod between said collar and the front side of the rear bracket, connections between said rod and the brakes for operating the brakes to check or stop rotation of the wheels on rearward movement of the rod relative to said body, two additional spaced apart collars fixed on said rod in front of the front bracket, and a vertical lever pivotally mounted between its ends on said trailer having its lower end extending between said collars, whereby movement of the lever in one direction moves the rod rearwardly and movement of the lever in the opposite direction prevents rearward movement of the rod.

3. In combination with a trailer body having an axle, wheels thereon and brakes associated with the wheels, of a rod extending underneath the body and adapted at its front end to be hitched to a pulling vehicle, means for mounting the rod on the body whereby on a forward pull on the rod the trailer will be pulled therewith, means connecting the rod with the brakes for operating said brakes to check or stop rotation of the wheels on rearward movement of the rod relative to the body, spring means resisting rearward movement of said rod, and manually operable means for independently moving said rod rearwardly relative to the body when said manually operable means is actuated in one direction and said manually operable means preventing rearward movement of said rod when actuated in the opposite direction.

4. In a combination with a trailer having wheels to carry the same and brakes associated with the wheels, of spaced apart front and rear brackets extending downwardly from the trailer and connected thereto, a rod slidably passing through said brackets, said rod extending a distance ahead of the trailer, a collar on the rod adapted to engage against the rear side of the front bracket, a coiled spring around the rod between said collar and the front side of the rear bracket, and connections between said rod and said brakes for operating the brakes to check or stop rotative movement of the wheels on rearward movement of the rod with respect to the trailer, a fixture for adjustably mounting the rear bracket secured to the underside of the trailer, said rear bracket being slidably lengthwise of said fixture, and threaded bolts passing through said brackets and extending between the same having nuts at one end and heads at the other for adjusting the position of said rear bracket with respect to the front bracket, and for adjusting the extent of compression of said spring.

THURLOW E. McFALL.